J. A. GRAY.

MACHINE FOR UNITING CAN BODIES AND HEADS.

APPLICATION FILED NOV. 11, 1912.

Reissued Feb. 2, 1915.

13,874.

4 SHEETS—SHEET 1.

WITNESSES

S. Constine

Geo. F. Booth

INVENTOR

James A. Gray

BY

R. A. Acker his ATTORNEY

J. A. GRAY.

MACHINE FOR UNITING CAN BODIES AND HEADS.

APPLICATION FILED NOV. 11, 1912.

Reissued Feb. 2, 1915.

13,874

4 SHEETS—SHEET 2.

WITNESSES

S. Constine.

Geo. F. Booth

INVENTOR

James A. Gray

BY

R. A. Acker

Atty. ATTORNEY

J. A. GRAY.
MACHINE FOR UNITING CAN BODIES AND HEADS.
APPLICATION FILED NOV. 11, 1912.
Reissued Feb. 2, 1915.
13,874.
4 SHEETS—SHEET 3.
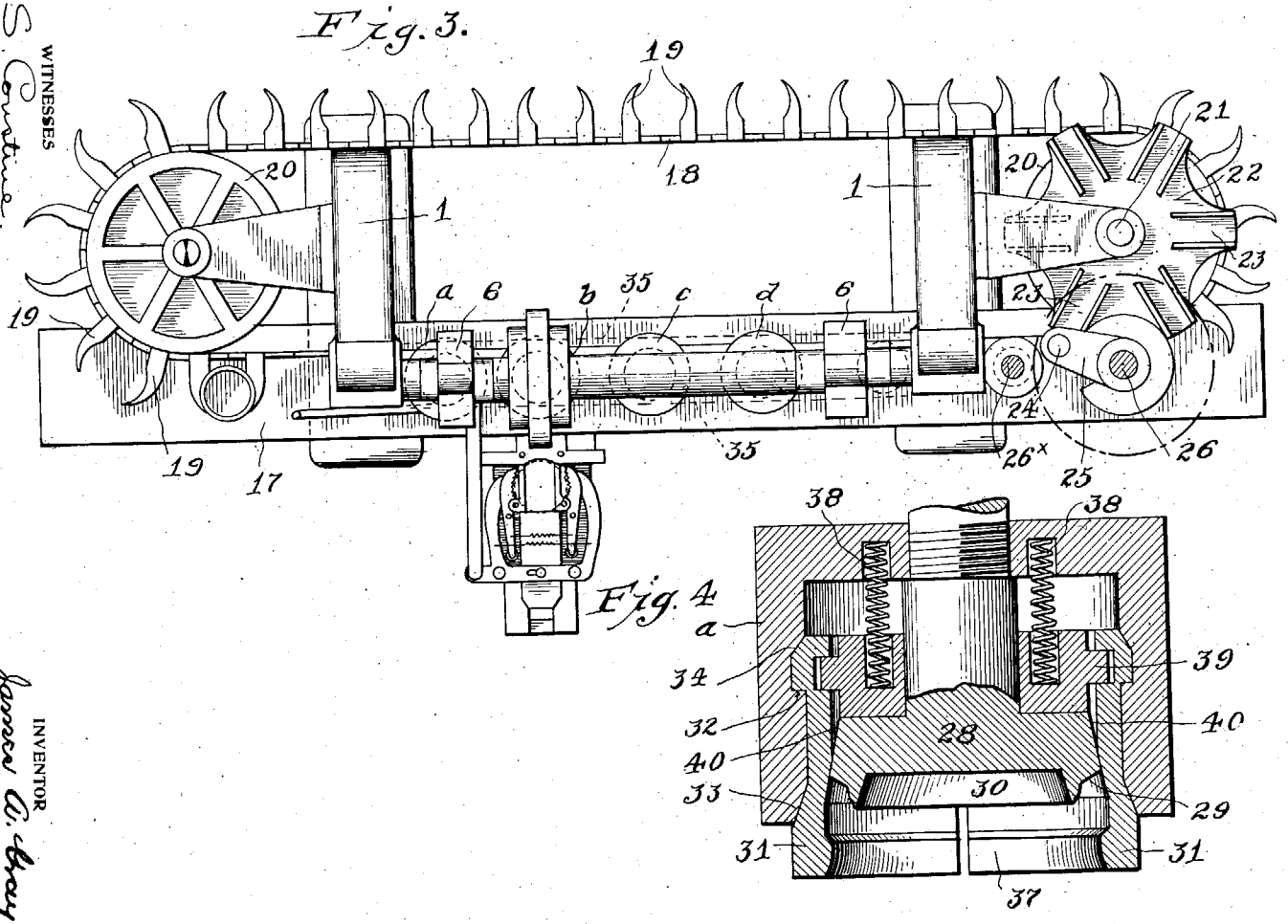
WITNESSES
S. Constine.
Geo. F. Booth
INVENTOR
James A. Gray
BY R. A. Acker
his ATTORNEY

J. A. GRAY.

MACHINE FOR UNITING CAN BODIES AND HEADS.

APPLICATION FILED NOV. 11, 1912.

Reissued Feb. 2, 1915. 13,874.

4 SHEETS—SHEET 4.

WITNESSES

S. Constine.

Jno. F. Booth

INVENTOR

James A. Gray

BY R. A. Acker

His ATTORNEY

UNITED STATES PATENT OFFICE.

JAMES A. GRAY, OF SAN FRANCISCO, CALIFORNIA.

MACHINE FOR UNITING CAN BODIES AND HEADS.

13,874. Specification of Reissued Letters Patent. Reissued Feb. 2, 1915.

Original No. 1,010,617, dated December 5, 1911, Serial No. 557,722. Application for reissue filed November 11, 1912. Serial No. 730,809.

*To all whom it may concern:*

Be it known that I, JAMES A. GRAY, a citizen of the United States, residing at San Francisco, California, have invented certain new and useful Improvements in Machines for Uniting Can Bodies and Heads, of which the following is a specification.

My invention relates to machines for making cans, and more particularly to that portion of such machines employed for seaming the can head to the can, and in the relation of such seaming mechanism to the other parts of the machine.

The invention consists in the features and combination and arrangement of parts hereinafter described and particularly set forth in the appended claims.

Figures 1, 8:
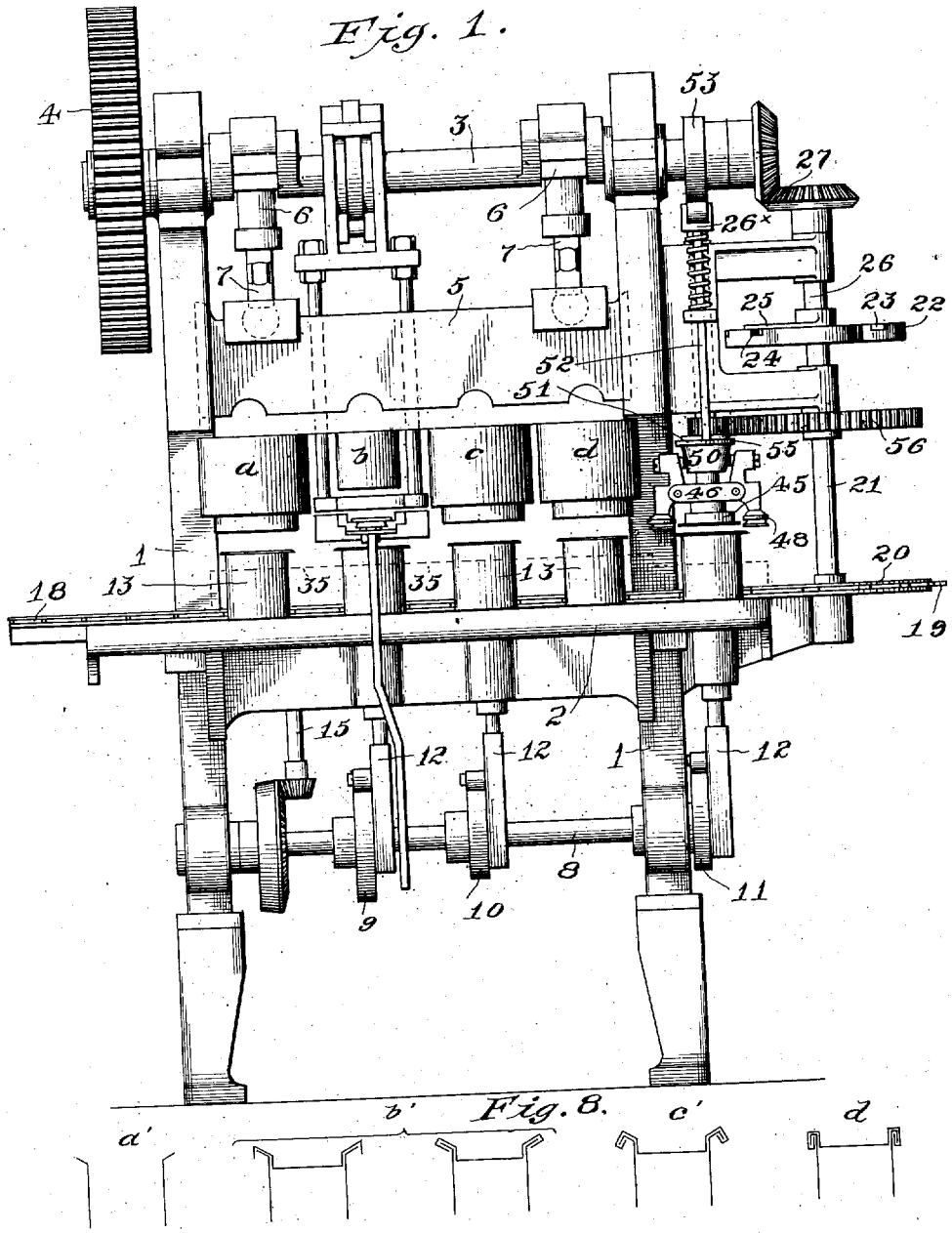
Figure 2:
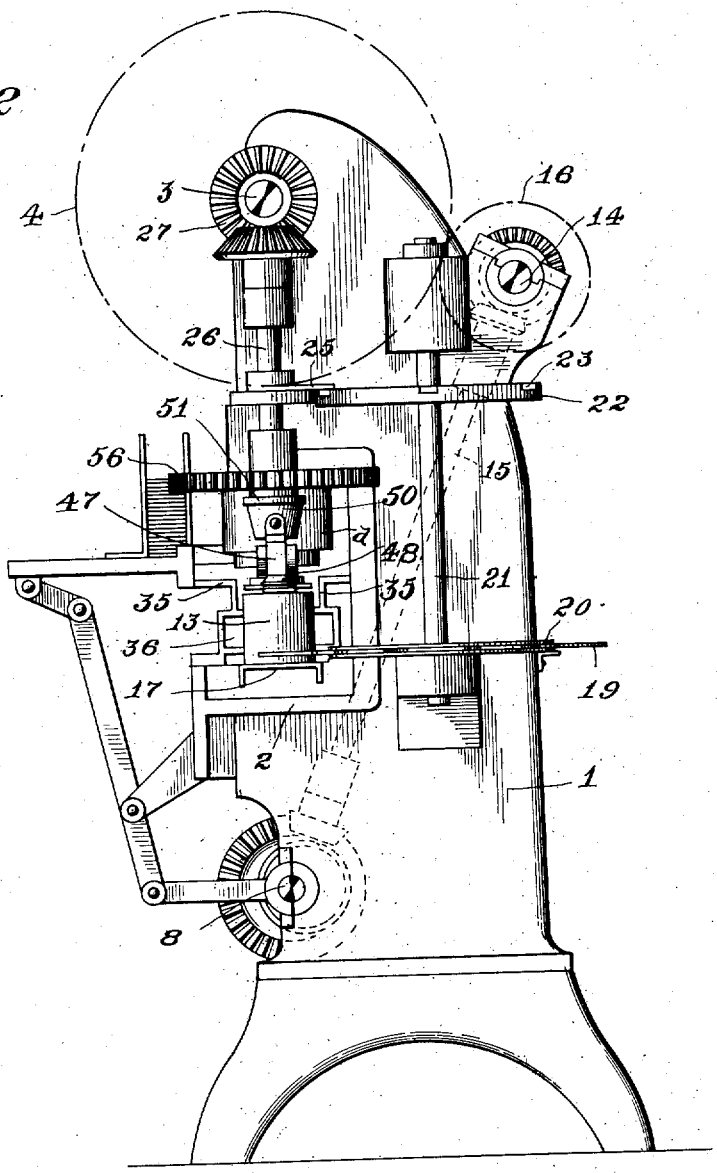
Figure 5:
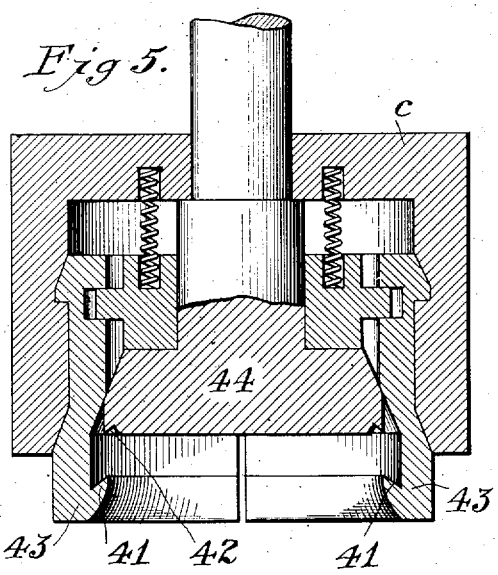
Figure 6:
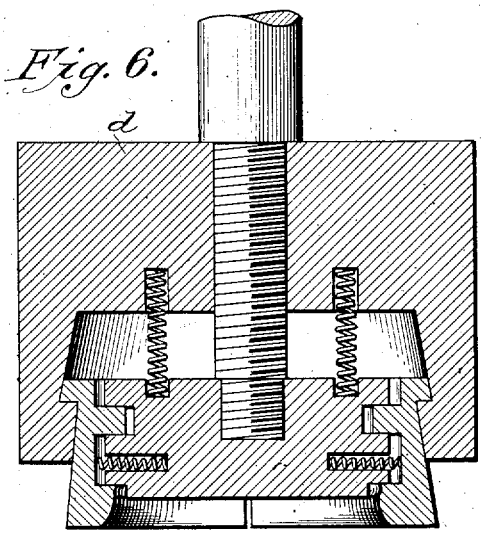
Figure 7:
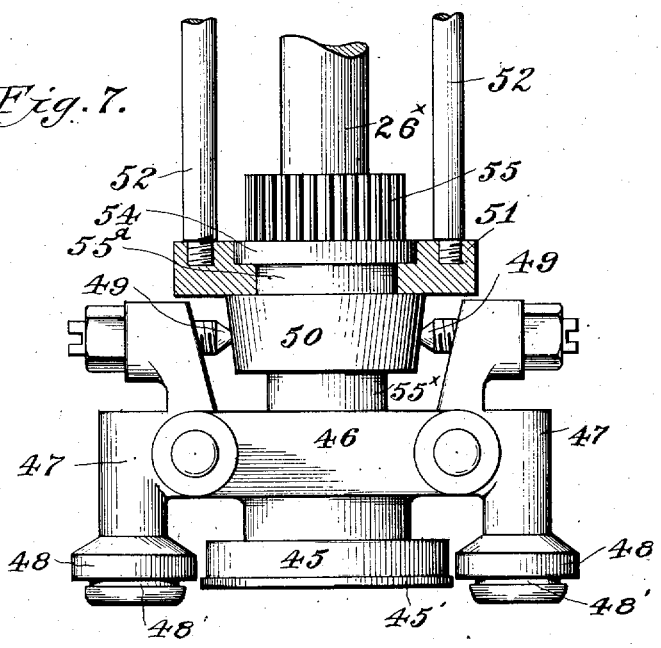

In the accompanying drawings—Figure 1 is a front view of a machine for making cans or attaching can heads to the bodies, and embodying my present invention; Fig. 2 is an end elevation of such machine looking from the right of Fig. 1; Fig. 3 is a plan view of the feeding mechanism for can bodies; Fig. 4 is a sectional view of the stamping head or crimping device wherein the flange is formed at the top edge of the can; Fig. 5 is a view similar to Fig. 4 of another stamping head for bending the flange of the head and body downwardly and outwardly; Fig. 6 is a view similar to Fig. 5 of another stamping head for performing the next step in the operation of forming the joint between the head and body; Fig. 7 is a side elevation of the seaming head; Fig. 8 shows the different steps in the operation.

In these drawings, 1 are the side frames of the machine connected by the cross plate or table 2, and having journaled at their upper parts a drive shaft 3 carrying a gear wheel 4 through which power is communicated to the machine. In the side frames, a cross head 5 is guided to move vertically, said cross head being operated from eccentrics or cams at 6 on the drive shaft 3, and being connected by eccentric rods 7 with the cross head. This cross head carries a plurality of stamping heads for performing different steps in the operation of uniting the can members, as will be hereinafter described, these stamping heads being indicated at *a*, *b*, *c* and *d*. At the lower part of the frame a shaft 8 is mounted carrying cams, as 9, 10 and 11, for giving vertical movement through rods 12, to vertically movable plungers for elevating the can bodies indicated at 13, to the several stamping heads. This shaft 8 is driven from a shaft 14 through an inclined shaft 15 and bevel gearing at the upper and lower portions thereof, the shaft 14 being driven from the main gear 4 through a gear 16. The can bodies to be united to the heads are fed along a table or way 17, suitably supported in the frame, by an endless chain 18 having jaws or projections 19 to grasp the can bodies, said chain passing around wheels 20 at opposite ends of the machine. One of these wheels is on a shaft 21 extending vertically and operated by a Geneva movement consisting of the wheel 22 thereon having arms or ways 23 extending radially and engaged by a pin or roller 24 on an arm 25 mounted on the vertical shaft 26, which is geared to the drive shaft 3 by the bevel gearing 27. By this Geneva movement the feed chain for the can is moved step by step, and at each movement a can is brought beneath the first stamping head *a*. This stamping head descends, and flares outwardly the upper edge of the can body, as shown in Fig. 8 at *a'*. For this purpose the stamping head is provided with an inner member 28 having an inclined edge 29 and a depending flange 30, the said inner member coöperating with jaws of segmental form shown at 31 within the main outer ring of the stamping head, and supported by the shoulder 32 on the said ring or head. These jaws 31 have inclines at 33, 34, so that, as the stamping head comes down, the jaws 31, by striking upon the fixed wall 35 of the way or channel 36 (see Fig. 2) along which the cans pass, will be forced inwardly toward each other by the continued movement of the main body of the stamping head, which causes the inclines 33 and 34 to press thereon and move the said jaws inwardly. These jaws 31 have inclined bearing surfaces at 37, and these, coöperating with the inclines 29 and the flange 30 on the inner member 28, will cause the upper edge of the can to be flared outwardly.

When the stamping head rises, springs 38 connected with the ring 39 which, in turn, is connected with the jaws 31, will lift the said jaws and they will be returned to their outer positions by the inclines 40 on the inner member 28. The next forward step movement of the feed chain will cause the can with its flared upper edge to be brought beneath the stamping head *b*, and at this point a can head will be fed into position above the can body, and the actions indicated at *b'* in Fig. 8 will take place; that is, the can head will have its flange bent into locking engagement with the flange of the can body, but the position of the parts will be flared upwardly. As this action and the means for performing the same form in themselves no novel part of the present invention, I have not shown it in detail herein. But means for feeding the can head into position and bending its flange and the flange of the can head into interlocking engagement, form a part of the invention claimed herein, in certain new combinations hereinafter pointed out. In my Patent No. 994,456, granted June 6, 1911, for assembling mechanisms for can bodies and heads, I have set forth mechanism for feeding the can head over the body of the can below the stamping head *b*, and for forming the body and head as shown at *b'* in Fig. 8. The next forward step movement of the feed chain will carry the can, with its united head, beneath the stamping head *c*, and this stamping head, as shown in Fig. 5, by means of the edges 41 and 42 on the segmental jaws 43 and inner member 44, respectively, will turn the united flanges of the head and body into the position shown at *c'* in Fig. 8. For this action the can body is lifted to a point within the stamping head *c* by means of the cam 10, and a suitable plunger operated thereby, as indicated in Fig. 1. After leaving the stamping head *c*, the can body, with its head, is conveyed to the stamping head *d*, which, as shown in Fig. 6, is composed of inner and outer members which turn the united flanges of the head and body into the position shown at *d'* in Fig. 8. The parts are now ready to be subjected to the action of the rotary seam compressing means comprising a rotary head. This head is shown at the right of Fig. 1, and in Fig. 7, and it comprises an inner member or ring 45 attached to a vertical shaft 26[x]. Rotatably mounted on said shaft is a cross bar or head 46 having pivotally mounted thereon arms 47 carrying seam compressing wheels 48 and carrying also at their upper ends points or bearings 49. A sleeve 55' is connected to said head at its upper end, and said sleeve carries a pinion 55 so that when the pinion is rotated by the gear 56 on the shaft 26 of the Geneva movement, the sleeve and cross head will also be rotated. A second sleeve 55[a] is loosely mounted on the sleeve 55', and this sleeve 55[a] carries at its lower end a cone member 50 and at its upper end a flange 54. The cone member is engaged by the points 49. This cone member is adapted to be moved vertically by a collar 51 located between the cone and flange 54, said collar being connected with rods 52 guided in the frame, and operated in any suitable manner from a cam 53 on the drive shaft 3. The center member 45 is provided with a flange 45' directly opposite the grooves 48' in the seam compressing wheels. After the can, with its attached head, leaves the stamping head *d*, it arrives over a vertically movable plunger operated from the cam 11, and it is raised by this plunger so that the recessed head of the can will be lifted in register with the center 45, and this center will enter the recess in the can head, so that its flange 45' will lie in the same plane with the bead or united flanges of the can and head. The rotation of the cross head 46 through the gear 55 will now cause the seam compressing wheels to seam the bead or flange tightly against the side of the can body, pressing all of the interlocking flanges closely together, so that a perfectly tight joint will be formed to render unnecessary the use of solder. As the seam compressing proceeds, the cone 50 is depressed by the operation of the rods and the cam 53 above described, so that the upper ends of the levers 47 will be separated, and the wheels will thus be pressed with a gradual movement and increasing pressure upon the bead of the can or the interlocked flanges. After the seam compressing action has been completed, the cam 11 lowers the plunger, together with the can, and the next movement of the feed mechanism conveys the can away from the seaming head.

I claim as my invention:—

1. In combination in a machine for making cans, a series of reciprocating non-rotary seaming dies arranged in line, a conveyer having a step by step movement for moving the can body with its head from one set of dies to another, and rotary seam compressing means in line with the series of seaming dies and to which the conveying means moves the can body and its attached head, with means for operating the seam compressing means, substantially as described.

2. In combination in a can making machine, a series of reciprocating non-rotary seaming dies for partially seaming, interfolding and uniting the can body and head, a conveyer, rotary seam compressing means to which the conveyer moves the cam members, a plunger for lifting the can members to the seam compressing means, and means for operating the same to complete the joint, substantially as described.

3. A can making machine comprising a table, step by step feeding means for moving the cans along the same, a series of reciprocating non-rotary seaming dies for securing the head to the can, means for actuating a seaming die each time the can comes to rest, and rotary seam compressing means to which the can is finally fed for finishing the seam.

4. In an apparatus for the described purpose, the combination with a series of reciprocating non-rotary seaming dies for uniting can heads to can bodies, of rotary means carrying compressing rollers associated therewith for receiving the can bodies with the applied heads and compressing the joint union between the same.

5. In a machine for double seaming a can head to a can body by a plurality of successive operations, in combination, a series of reciprocating non-rotary seaming dies and rotary means carrying compressing means for acting upon the same seam, substantially as specified.

6. In a machine for the described purpose, the combination with a series of reciprocating non-rotary seaming dies for forming a double seam between an outwardly flanged can body and head, means for conveying a can beneath one of the seaming dies, mechanism for placing the last mentioned seaming die into engagement with a positioned can head for interlocking the flange of the head with the flange of the body in a double seam, rotary mechanism for compressing the said flanges to form a tight seam, and devices for conveying the can from the seaming dies to the rotary compressing mechanism.

7. In a machine for attaching heads to flanged can bodies, reciprocating non-rotary die mechanism for interfolding and interlocking the head flanges with the outwardly turned flanges of the body in the form of a double seam, and combined therewith roller mechanism for compressing the said interlocking flanges and actuating devices for operating the said die mechanism and roller mechanism.

8. In a machine for the described purpose, the combination of reciprocating non-rotary die mechanism for outwardly flanging the open end of a can body and partly uniting a can head thereto by an interfolding and interlocking of the head flange to the outward flange of the can, devices for actuating the die mechanism, and rotary means provided with compressing rollers for receiving the can with its interlocked head and compressing the flange of the can head to the flanged end of the can.

9. In a machine for the described purpose, the combination with a can carrier, of means for imparting an intermittent movement thereto, a series of reciprocating non-rotary seaming dies to which the can is successively delivered for flanging the open end of the can and interfolding and interlocking the flange of a can head therewith, means for successively actuating said seaming dies during the movement of the can thereunder, and rotary mechanism provided with compressing rollers, for receiving the can with its locked head from the last of the series of seaming dies and compressing the flange of the can head to the flanged end of the can.

10. In a machine for the described purpose, the combination with a series of reciprocating non-rotary seaming dies for flanging the open end of a can or can body and interlocking a positioned can head thereto by interfolding the flange of the head with the flanged end of the can, of rotary mechanism provided with compressing rollers for receiving the can with its interlocked head and compressing the flange thereof to the flanged end of the can, and associated means for imparting reciprocating movement to the seaming dies and rotation to the rotary mechanism carrying the compressing rollers.

11. In a machine for the described purpose, the combination with a series of reciprocating non-rotary seaming dies for flanging the end of a can body and gradually locking a can head thereto by interfolding the flange of a can head with the flanged end of the can, and rotary mechanism carrying compressing rollers for receiving the can body with its united head and compressing the interlocked flanges of the can body and head.

12. An organized apparatus for uniting a head to a can body, the same comprising reciprocating non-rotary seaming dies for first stamping the open end of a can body to outwardly flare the same, and subsequently uniting a can head thereto by stamping the flange thereof into interlocked engagement with the flared end of the can body, and rotary mechanism carrying compressing rollers for receiving the can body with its interlocked head and securely uniting the same thereto by compressing the interfolded flanges of the head and body.

13. In a machine for the described purpose, the combination with a carrier, of means for imparting intermittent movement thereto, reciprocating non-rotary seaming dies for flanging the open end of a can body to outwardly flare the same, reciprocating non-rotary seaming dies for forming a double seam locked joint between the can body and a can head for partially uniting the same, means for actuating said seaming dies as a can body is placed thereunder, and rotary mechanism carrying compressing rollers for receiving the can body with its partially locked head and compressing the interlocked flanges of the can body and head for securely uniting the head to the body.

14. In a machine for the described purpose, the combination of reciprocating non-rotary seaming die mechanism for stamping the open end of a can body and uniting a can head thereto by gradually folding and ultimately interfolding the flange of the can head with the flanged end of the can body for partially uniting the same, and associated rotary mechanism carrying compressing rollers for receiving the can body with its interlocked head and closing the joint union by compressing the flange of the can head to the flanged end of the can body.

15. In an apparatus for the described purpose, the combination with a series of reciprocating non-rotary seaming dies for interlocking the flange of a can head with the outwardly flanged end of a can body for the production of a double seam, and associated rotary mechanism carrying compressing rollers for receiving the can with its united head and completing the double seam union by compressing the interfolded flanges of the body and head.

In witness whereof I have hereunto affixed my signature in the presence of subscribing witnesses.

JAMES A. GRAY.

In the presence of—
N. A. ACKER,
D. B. RICHARDS.